United States Patent [19]

Niemi

[11] Patent Number: 4,476,155

[45] Date of Patent: Oct. 9, 1984

[54] HIGH VOLTAGE INSULATORS

[75] Inventor: Randolph G. Niemi, Midland, Mich.

[73] Assignee: Dow Corning Corporation, Midland, Mich.

[21] Appl. No.: 485,812

[22] Filed: Apr. 18, 1983

[51] Int. Cl.$^3$ .......................... B05D 5/12; H01B 17/00
[52] U.S. Cl. ...................................... 427/58; 427/387; 174/137 A; 174/137 B; 252/573
[58] Field of Search ............. 427/58, 387; 174/137 A, 174/137 B; 252/573

[56] References Cited

U.S. PATENT DOCUMENTS

| | | | |
|---|---|---|---|
| 3,511,698 | 5/1970 | Talcott | 117/138.8 |
| 3,965,065 | 6/1976 | Elliott | 260/375 B |
| 4,001,128 | 1/1977 | Penneck | 174/137 B |
| 4,011,168 | 3/1977 | Uhlman | 252/63.7 |
| 4,177,322 | 12/1979 | Homan et al. | 423/447 |
| 4,189,392 | 2/1980 | Penneck | 252/63.2 |

FOREIGN PATENT DOCUMENTS 889898  1/1972  Canada .................................. 400/72

OTHER PUBLICATIONS

Niemi, "Self-Priming Silicone Elastomeric Coating for High Voltage Insulator Bodies," 10th Electrical Insulation Conference.

Primary Examiner—John E. Kittle
Assistant Examiner—James J. Seidleck
Attorney, Agent, or Firm—Edward C. Elliott

[57] ABSTRACT

A method of manufacturing an improved electrical high voltage coated insulator is described. The method involves applying and curing a one-part, room temperature curable silicone composition to the surface of an insulator, the insulator surface having a minimum designated arc resistance. The silicone composition is the product obtained by mixing in the substantial absence of moisture a specified polydimethylsiloxane fluid containing hydroxyl radicals, finely divided aluminum hydroxide filler, a silane of the formula $R_bSi(ON=X)_{4-b}$ and an optional condensation catalyst. The coating cures on exposure to atmospheric moisture to produce a surface adhered onto the insulator that resists the development of leakage currents and flashover failure upon exposure to electrical stress, moisture, contamination, and other outdoor weathering stresses.

20 Claims, No Drawings

HIGH VOLTAGE INSULATORS

BACKGROUND OF THE INVENTION

1. Field of the Invention

This invention relates to a method of producing a coated high voltage insulator. The surface of the insulator is a cured one part, room temperature curable silicone composition.

2. Description of the Prior Art

High voltage electrical insulators have historically been constructed of glass and porcelain. These materials of construction allowed the manufacture of insulators such as the familiar post insulators and cap and pin suspension insulators. Under normal conditions, these insulators gave a long service life in spite of exposure to weathering, mild contamination, and electrical stress and leakage currents. Under conditions of severe contamination, frequent cleaning or coating with silicone grease-like compounds was found necessary to prevent excessive leakage currents. With the use of higher voltages for transmission, the size and weight of this type of insulator has become excessive. At very high voltages, greater than 375 KV for instance, the creepage distance requirements dictate an insulator of such a length that the mechanical strength of ceramic cap and pin insulators is inadequate. Composite insulators are now being evaluated using organic and inorganic resins and elastomers as a substitute in locations where the glass and porcelain insulators are not suitable. Failure of composite insulators has occurred in some areas having severe contamination.

In the use and testing of composite insulators, it has become evident that the materials of construction and the design of the insulator must be selected to satisfy the unique combination of physical and electrical requirements imposed on the insulators. Many different methods of producing and improving composite insulators have been proposed and developed.

A weatherable insulator taught by Talcott in U.S. Pat. No. 3,511,698, issued May 12, 1970, comprises a rigid, cured thermosetting resin base member and a surface coating of at least 0.25 mm thickness of cured, organopolysiloxane elastomer. The elastomer is a stock based upon an organopolysiloxane containing SiH groups or Si bonded alkenyl radicals or both or a combination of organopolysiloxane and crosslinker where one type of functional group is in the base polymer and the other in the crosslinking agent. A platinum material is used to catalyze the cure to an elastomer. It is desirable that the elastomer stock contain from 5 to 15 weight percent of hydrated aluminum oxide to improve the track resistance.

In a paper given at the 10th Electrical Insulation Conference, held Sept. 20 to 23, 1971, titled "Self-Priming Silicone Elastomeric Coatings for High Voltage Insulator Bodies," I taught that a silicone composition containing Me(H)SiO— and (Me)$_2$SiO—organic substituents in the siloxane structure gave the best results, when tested for hydrophobicity, both before and after corona exposure, and for arc-track resistance, as a coating for insulators.

Penneck teaches in Canadian patent No. 889,898, issued Jan. 4, 1972, that an improved high voltage insulating material is a mixture of polymer and filler which is termed "anti-tracking filler system". This anti-tracking filler system comprises a hydrate of alumina having a specific surface area of at least 2 m$^2$/g and an oxide, mixed oxide, or mixture of oxides containing at least one element from the transition elements, the lanthanide series, or the actinide series. Among his polymeric materials taught as useful are polydimethylsiloxane, dimethylsiloxane/methylvinylsiloxane copolymers, fluorosilicones, and carborane siloxanes. In his examples, he shows curing a dimethylsilicone elastomer with an organic peroxide.

In U.S. Pat. No. 3,965,065, issued June 22, 1976, Elliott teaches a method of improving the electrical properties of organopolysiloxane elastomers by heating a mixture of an organopolysiloxane convertable to the solid elastic state and aluminum hydrate for at least 30 minutes at a temperature above 100° C. to provide a composition which can be cured to an elastomer having improved electrical properties. He teaches the elastomer forming compositions of his invention may be converted to the elastic state by any suitable curing technique, including so-called cold curing mechanisms wherein the convertible organopolysiloxane contains functional radicals, e.g. hydroxyl, oximo, or acyloxy and curing takes place at normal or slightly elevated temperatures with or without the addition of a crosslinking agent and a curing catalyst.

In U.S. Pat. No. 4,189,392, issued Feb. 19, 1980, Penneck teaches an electrical insulating material suitable for high voltage applications comprising a polymeric material having incorporated therein an anti-tracking material such as an inorganic metal oxide, hydroxide, or salt, including hydrates of alumina and an erosion inhibiting, hydrophobic, non-ionic, fluorine substituted compound. Silicone polymers are included in his list of suitable polymers.

In U.S. Pat. No. 4,011,168, issued Mar. 8, 1977, Uhlman teaches a composition useful as an electrical coating to protect transmission insulators. The composition consists essentially of a siloxane fluid and from 50 to 80 percent by weight of a mineral filler selected from the group consisting of clays, ground quartz, gypsum, silica, and aluminum oxide. Finely divided hydrated aluminum oxide is most preferred. The composition is a non-curing product of a grease-like consistency.

In U.S. Pat. No. 4,177,322, issued Dec. 4, 1979, Homan et al. teach a specific polydiorganosiloxane fluid which is coated on the surface of devices such as electrical transmission line suspension insulators to improve their resistance to the development of excessive leakage currents.

SUMMARY OF THE INVENTION

An improved coated, high voltage electrical insulator is constructed by applying to the outer surface of the insulator a one-part, room temperature curable silicone composition. At least all of that portion of the insulator which is constructed of an electrically non-conducting material is coated to give a smooth, coherent coating. The silicone composition comprises the product obtained by mixing hydroxyl endblocked polydimethylsiloxane having a viscosity in the range of from 5 to 20 Pa·s at 23° C., aluminum hydroxide having an average particle size of less than 5 micrometers, and a ketoxime functional silane. The cured coating, bonded to the insulator substrate, exhibits improved resistance to electrical leakage current and flashover while under the effect of high voltage stress over the surface of the insulator when subjected to the stress in the presence of moisture, contaminants, and normal outdoor weathering stresses such as ultraviolet light exposure.

It is an object of this invention to produce a coated electrical insulator having a useful life longer than the uncoated insulator, especially when used in locations where the insulator is exposed to contamination and moisture.

It is an object of this invention to produce a coated electrical insulator having a sealed surface which reduces the ingress of liquid moisture.

It is an object of this invention to produce a coated electrical insulator which maintains a low leakage current level over a long period of time when used in locations where the coated insulator is exposed to contamination and moisture.

It is an object of this invention to produce a coated insulator which can be produced in the field.

DESCRIPTION OF THE INVENTION

This invention relates to a method of improving an electrical high voltage insulator comprising (I) applying to a high voltage insulator whose surface has arc resistance of at least 750 minutes when measured according to ASTM D-2303 at 2.5 KV, a smooth, coherent, coating of a one package, room temperature curable silicone composition wherein the composition comprises the product obtained by mixing in the substantial absence of moisture, (A) from 45 to 70 percent by weight of
  (1) 100 parts by weight of polydimethylsiloxane fluid of the formula $Y(Me_2SiO)_aH$ in which Y is methyl or hydroxyl radical, at least 85 percent of Y are hydroxyl radicals, a has a average value such that the viscosity is in the range of from 5 to 20 Pa·s at 23° C., and Me is methyl radical, and (2) from 10 to 30 parts by weight of silane of the formula $R_bSi(ON=X)_{4-b}$ in which R is selected from the group consisting of monovalent hydrocarbon radicals and monovalent halohydrocarbon radicals, X is selected from the group consisting of $R_2'C=$ and

radicals in which R' is selected from the group consisting of monovalent hydrocarbon radicals and monovalent halohydrocarbon radicals and R" is selected from the group consisting of divalent hydrocarbon radicals and divalent halohydrocarbon radicals and b is an integer from 0 to 1 inclusive, (B) from 30 to 55 percent by weight of aluminum hydroxide having an average particle size of less than 5 micrometers, the product being storage stable in containers which exclude moisture, but which cures when exposed to moisture, then (II) exposing the coating to atmospheric moisture for a time sufficient to cure the coating to produce a bonded, elastomeric coating of at least 0.25 mm thickness.

Electrical insulators for high voltage use are traditionally made from glass or porcelain. These materials are comparatively low cost, of high quality electrically, and under normal conditions, long lasting in service. They are also fragile and lack versatility in manufacturing methods and design flexibility. As power transmission moves to higher and higher voltages, new insulation systems are being developed and new materials are being tested and put into use. Insulators were developed which are based upon a fiberglass reinforced rod to provide physical strength in both suspension insulators and stand-off insulators with sheds molded along the rod to provide the necessary creepage distance. The sheds have been molded of many different types of materials, both resinous, such as polyester and epoxy resins, and elastomeric, such as ethylene-propylenediene rubbers, and silicone elastomers. Many different types of composite insulators have been developed and used in commercial installations.

A problem has surfaced in the use of composite insulators in outdoor service. In such service, the insulator is subjected to electrical stress, as well as, the effects of exposures such as sunlight, rain, snow, industrial pollution, wind-blown agricultural chemicals, salt fog along coastal regions, and sand storms in the desert. A useful insulator must be able to withstand the effects of such multiple exposures for a long period of time. In the development of composite insulators, several test methods were developed to measure the effects of electrical stress on an insulation material under a variety of exposure conditions.

An insulator, such as the suspension insulator on a high voltage power transmission line, is designed so that the voltage stress at any point is low enough to eliminate, or keep to a minimum, corona discharges under normal conditions. However, when an insulator surface used outdoors becomes contaminated with ionic materials and then becomes wet from rain or fog, leakage currents develop along the surface of the insulator. The amount of leakage current developed depends upon the voltage stress and the conductivity of the film of moist contaminant. This flow of current generates heat which dries the surface. The partial drying out of the surface (dry band formation) causes an interruption of the current, which in turn causes minute arcs (dry band arcing) to be drawn on the surface of the insulation. The arc can lengthen until it can no longer be sustained by the voltage available or under abnormal surges, can result in flashover. This arcing can also have serious effects upon the insulator surface. When the insulator surface is an organic material, the arc can cause free carbon or nonvolatile semiconductor materials to form. Successive arcs will cause a continuous conducting path to form across the surface of the insulator, eventually effectively shorting out the insulator. Alternately, the arcs may volatilize or erode away the surface of the insulator. In general, a material which produces a permanently conducting substance under service conditions is unsatisfactory. A material which erodes may be satisfactory if the rate of erosion is low enough so that the erosion does not significantly impair the electrical or mechanical properties of the insulator during the required life. Tests have been developed to judge the usefulness of materials as being suitable for electrical insulation which accelerate the tendency of materials being tested to form conductive tracks or erode under the effect of electrical arcs. ASTM D-495 is a test for high-voltage, low current, dry arc resistance of solid electrical insulation. It subjects the surface of the sample to an intermittent arc between two electrodes resting on the surface. As the test progresses, the frequency of the arcs is increased, then the current flow is increased. The time period for the creation of a conductive track between the electrodes is measured. The amount of erosion of the sample surface is also noted.

Another test method is described in ASTM D-2303, liquid-containment, inclined plane tracking and erosion of insulating materials. In this test method a sample 50 mm by 130 mm is supported at a 45° angle with a metal electrode at each end. A liquid, electrically conductive contaminant flows at a specified rate down the surface of the sample between the two electrodes. A test voltage between the electrodes causes a continuous surface discharge with controlled energy to form on the sample surface. The test is intended to be an accelerated form of the type of exposure found on insulators in service.

Many different types of organic polymers were tested in combination with a variety of fillers and additives using these tests to estimate their resistance to the effects of arcing. Through such development work, formulations were developed which are arc-track resistant according to the test conditions. One of the results of such testing is the conclusion that the arc resistance can be improved by the addition of hydrated aluminum oxide as taught in U.S. Pat. Nos. 3,511,698 and 4,189,392.

Observations of insulators manufactured using organic resins or elastomers with the arc-track resistant fillers showed that the use of such hydroscopic fillers in organic resin or elastomers had a drastic effect on the surface conductance of a molded insulator. After such an insulator was exposed to corona, arcing, erosion, or the weather, the filler-exposed surface was easily wet when exposed to moisture, such as in a fog or rain. A continuous water film over the insulator surface allowed leakage current to flow and create excessive dry-band arcing and premature flashover to occur such as discussed above.

With the realization that more than arc resistance was required to make useful composite insulators for outdoor service, a new type of test was developed to more closely subject samples to the type of stress found in actual service. In actual service, an insulator experiences very limited exposure to a critical operating condition of high arc currents. But, preceding the condition of high dry-band current, the insulator surface is exposed to thousands of hours of lower discharge activity that will contribute substantially to the surface degradation and changes in the wet voltage capability of the insulator surface. A fog chamber test was developed which subjects insulator samples to a voltage stress in the presence of a conductive fog. The severity of the test conditions is gradually increased by either raising the voltage stress over the insulator surface or by increasing the conductivity of the fog. Either method increases the current flow over the surface of the insulator. This method of testing takes into account the resistance of the insulator to form a continuous water film and a conductive path over its surface. Materials such as glass and porcelain are wet by water, so a fog creates a wet surface on such a material and a current will flow if there is any conductive material present in the fog or upon the insulator surface. Materials such as silicone or unexposed polytetrafluoroethylene are not wet by water, so a fog condition creates individual drops of water on such a surface rather than a continuous film. The flow of current under such conditions is much less and the tendency for dry-band arcing is suppressed. Such a test measures the amount of current flow over the insulator surface as a function of time. Because insulators do not operate in wet conditions at all times, the test conditions are cycled, ordinarily exposing the insulator to a voltage stress and fog for a 16 hour period, then an 8 hour period with no voltage or fog.

By using the results of accelerated life tests such as those discussed above, an improved method of constructing insulators for use under high voltage conditions was developed. The insulator can be constructed using either inorganic materials such as glass or porcelain, or polymeric materials such as epoxy resins, polyester resins, silicone resins, ethylene-propylene elastomers, ethylene-propylene-diene elastomers, or silicone elastomers as well as other known polymeric materials. The polymeric materials are combined with fillers to produce a material having an arc resistance when tested according to ASTM D-2303 of at least 750 minutes when tested at 2.5 KV in the time to track test. The insulator can be those constructions known to be useful as electrical insulators such as the common glass or porcelain post insulators, or cap and pin suspension insulators, or composite insulators such as those made with a fiberglass reinforced resin rod through the center, with mounting hardware attached to the ends, and sheds placed along the rod to create the desired leakage length. One important requirement of the material used to manufacture the insulator is that it have the required arc resistance so that if the coating used in the method of this invention is destroyed at some point, such as by gunfire, the insulator under the coating will not be immediately destroyed by subsequent electrical arcing and tracking.

The outer surface of an electrical insulator is a most important part of the insulator in that this is the part of the insulator that is subjected to the effects of electrical voltage stress, leakage currents, and to the weather. The one part, room temperature curable silicone composition used to produce the outer surface of the coated insulator by the method of this invention allows the production of an improved insulator in that the surface of the coated insulator is arc resistant, hydrophobic, and resistant to the stresses imposed upon outdoor electrical insulators. The silicone composition is used to coat at least those portions of the insulator constructed of electrically non-conducting material. The coating protects the underlying insulator material and gives an outer surface on the coated insulator which is both hydrophobic and arc resistant.

The mixture of (A) contains 100 parts by weight of polydimethylsiloxane fluid of the formula $Y(Me_2SiO)_aH$ in which Y is methyl or hydroxyl radical, at least 85 percent of Y are hydroxyl radicals, a has an average value such that the viscosity is in the range of from 5 to 20 Pa·s at 23° C., and Me is methyl radical. The polydimethylsiloxane is endblocked with hydroxyl radicals or trimethylsiloxy units. The polydimethylsiloxane fluid can be a mixture of fluids having different endblocking arrangements in that both ends can be hydroxyl, or one end can be methyl and one can be hydroxyl. The polydimethylsiloxane fluid can also contain small amounts of cyclic materials and monomethylsiloxane units such as are found in commercial production of polydimethylsiloxane fluids. The polydimethylsiloxane fluid can have the methyl radical on the polymer chain replaced with other radicals in very small amounts such as impurities found in commerical materials, but the preferred fluid contains only methyl radicals.

Part (A) of the silicone composition can also contain up to 100 parts by weight of a polydimethylsiloxane fluid (3) of the formula $Me(Me_2SiO)_cSiMe_3$ in which c preferably has an average value such that the viscosity is greater then 0.05 Pa·s at 23° C. and Me is methyl radical. The amount of fluid added and its viscosity will have an effect upon the consistency of the silicone composition and the physical properties of the cured composition.

The silicone composition used in the method of this invention contains in (A) silane of the formula $R_bSi(ON=X)_{4-b}$ in which R is selected from the group consisting of monovalent hydrocarbon radicals and monovalent halohydrocarbon radicals and b is an integer from 0 to 1 inclusive. The radical represented by X is selected from the group consisting of $R_2'C=$ and

radicals in which R' is selected from the group consisting of monovalent hydrocarbon radicals and monovalent halohydrocarbon radicals and R" is selected from the group consisting of divalent hydrocarbon radicals and divalent halohydrocarbon radicals. Each R and R' can be a monovalent hydrocarbon radical or a halogenated monovalent hydrocarbon radical, for example, alkyl radical such as methyl, ethyl, and isopropyl, alkenyl radical such as vinyl and allyl and halogenated monovalent hydrocarbon radicals such as chloromethyl and 3,3,3-trifluoropropyl. Preferred R and R' radicals are methyl and ethyl radicals. R" can be a divalent hydrocarbon radical or divalent halohydrocarbon radical, for example
—$CH_2(CH_2)_3CH_2$—,

and —$CF_2(CF_2)_2CF_2$—. Methods of making the silanes used in this invention are disclosed in U.S. Pat. No. 3,189,576, issued June 15, 1965, which is hereby incorporated by reference to show methods for manufacture of the silane.

A preferred silane is of the formula $R_bSi(ON=CR_2')_{4-b}$ in which each R and R' are monovalent hydrocarbon radicals. The preferred R radicals are methyl, ethyl or vinyl with methyl radical most preferred. R' radicals are preferably methyl or ethyl. The preferred silanes are methyltri(dimethylketoximo)silane and methyltri(methylethylketoximo)silane. The silane is used in an amount such that there is 5 to 30 parts by weight of silane per 100 parts by weight of polydimethylsiloxane fluid (1). Preferred compositions are produced using from 10 to 30 parts by weight of silane per 100 parts by weight of polydimethylsiloxane.

The silane of the formula $R_bSi(ON=X)_{4-b}$ is suitable for use in the method and composition of this invention in spite of the fact that the composition contains aluminum hydroxide which contains about 35 percent by weight of hydroxyl radicals and yet the composition, which is moisture curable, maintains a useful shelf life of at least several months to preferably greater than one year. When a similiar composition was prepared using an acetoxy functional silane to prepare a moisture curable composition, the shelf life of the composition was less than 2 months. A composition using methyltrimethoxysilane and tetrabutyltitanate was evaluated but it was considered undesirable due to its slower cure rate, shorter shelf life, and poorer adhesion. Use of the silane of this invention with the hydroxyl containing polydimethylsiloxane allows the production of a one-package composition. This permits consistent formulation and ease of application under field conditions, whereby 2 package systems allow for error in mixing, possess limited shelf life, or limited pot life once they are mixed, and normally require heat to cure.

A condensation catalyst can be included to accelerate the rate of cure of the silicone composition on exposure to moisture. Preferably the condensation catalyst is a carboxylic acid salt of tin. Typical carboxylic acid salts include dibutyltindiacetate, stannous octoate, dibutyltindilaurate, and dibutyltin-dioctoate with dibutyltindioctoate being preferred. Catalyst amounts preferred are from 0.2 to 0.5 part by weight per 100 parts by weight of polydimethylsiloxane.

Also permitted are ingredients such as pigments, other fillers in minor amounts, and other ingredients commonly used in silicone compositions provided that the final composition is tested to assure that these other additional ingredients do not degrade the arc-track resistance or leakage current supression of the cured coating.

The filler (B) used in the silicone composition is aluminum hydroxide, also known as aluminum trihydrate or hydrated aluminum oxide. It is represented by the formula $Al_2O_3 \cdot 3H_2O$. For use in this invention the aluminum hydroxide has an average particle size of less than 5 micrometers, preferably less than 1 micrometer. Because the particle size of the filler is small, it can be more uniformly dispersed, and the more completely it is dispersed in the composition, the more uniform and homogeneous the silicone composition becomes. It is desirable to have a homogeneous composition because it gives better results when the composition is subjected to electrical stress. The aluminum hydroxide is used in an amount of from 30 to 55 percent by weight based upon the sum of (A) and (B). It is preferred that the amount of aluminum hydroxide be from 40 to 55 percent by weight. Amounts of aluminum hydroxide lower than 30 percent result in a coating which does not have sufficient arc resistance for optimum life of the insulator. Amounts of aluminum hydroxide higher then 55 percent by weight result in coatings having a reduced degree of hydrophobicity so that leakage currents are more easily established on the insulator surface when the insulator is subjected to humid conditions. Such a condition leads to a shortening of the useful life of the insulator. Amounts of aluminum hydroxide higher than 55 percent by weight produce compositions with excessively high viscosity which are difficult to process.

A non-reactive solvent can be used to thin the silicone composition to the viscosity preferred for certain application methods. A dry solvent capable of dispersing the polydimethylsiloxane can be toluene, xylene, chlorothene, or naphtha. The solvent identified as VM and P naphtha having a specific gravity of 0.73 and a boiling range of from 100° C. to 160° C. is a preferred solvent as it can be obtained relatively free of water. By dispersing the silicone composition in solvent, the viscosity can be reduced so that it can be applied to the insulator surface by brushing, spraying, or dipping.

The one part room temperature curable silicone composition used in the method of this invention is prepared by mixing the ingredients together in the substantial absence of moisture. The silane is moisture sensitive so that the mixture must be essentially absent of free moisture when the silane is added and maintained in the moisture free state until cure is desired, such as by storing it in a container which excludes moisture.

A preferred method of mixing comprises mixing the aluminum hydroxide into the polydimethylsiloxane in a dough mixer by slowly adding the aluminum hydroxide to the polydimethylsiloxane while mixing. It is preferred to heat the polymer to a temperature of from 100° C. to 200° C. to aid in mixing the filler into the polymer. This heating step also removes any free water which may be present in the mixture. After the filler is completely dispersed in the polymer, the mixture is cooled. If solvent is to be used in the composition, the non-reactive solvent is then slowly admixed so that it combines with the mixture of polymer and filler and gradually thins it. The solvent should not contain free water. A preferred method of adding the silane and catalyst is to first heat the silane to about 70° C., then stir in the catalyst until it is dissolved in the silane. The silane-catalyst mixture is then added to the polymer-filler-solvent mixture in a mixing device which prevents contact with atmospheric moisture and the mixture is stirred until homogeneous. The mixture is storage stable as long as moisture is excluded such as by placing the mixture in containers which exclude mositure.

The surface of the high voltage insulator is coated with the silicone composition by conventional methods such as dipping, brushing, or spraying. The silicone compositions preferably contain solvent to adjust the consistency to a value suitable for use in these methods of application. Insulators can be coated by slowly rotating the insulator while dipping it into a bath of the silicone composition. After a uniform coating is formed over the surface of the insulator, the insulator is withdrawn from the bath and rotation is continued in the air while the solvent evaporates until the surface of the coating becomes thick enough to prevent flow of the coating over the insulator surface. The coated insulator is then suspended in the atmosphere until the coating is completely dry, cured, and bonded to the insulator. This method produces a smooth, uniform coating, which is desirable. The insulator can also be coated by brushing or spraying in the conventional manner, making certain that the coating is as smooth and uniform as possible. A wet, solvent containing coating should be at least 0.3 mm thick at all points to insure adequate protection to the insulator. A coating of this thickness cures to a handleable degree in about 24 hours under normal atmospheric conditions with a complete cure by 7 days. The cured coating should be at least 0.25 mm thick and bonded to the insulator.

In applying the one package, room temperature curable silicone composition of this invention, the composition is coated over the entire insulator surface which is constructed of electrically non-conductive material. It can also be coated over the entire insulator surface. For instance, in a conventional cap and pin ceramic suspension insulator, the ceramic portion of the insulator can be coated with the more hyrophobic silicone composition. Such an insulator can also be coated by covering not only the ceramic portion, but also the metal cap and pin. This is the method of applying the coating that would be used when the coating is applied in the field to an insulator that is already installed in a string on a transmission line. The most preferred method would be to dilute the silicone composition with non-reactive solvent to the proper viscosity for application with a spray system, then spray the entire surface of the insulator string in place on the unenergized line. After spraying, the line can be re-energized while the coating dries and cures because the coating is electrically non-conductive both as a curable compositon and as a cured coating.

An improved high voltage, electrical, coated insulator produced under the method of this invention is capable of operation under a higher voltage stress in the presence of moisture, such as rain or fog, in combination with contaminated atmospheres such as found in industrial locations, along sea coasts where salt spray is found, and in agricultural areas where fertilizers and pesticides are widely distributed by spraying during application as well as by the wind. Coated insulators produced by the method of this invention resist the formation of leakage currents for extended periods of time and resist the effects of leakage currents when they are finally produced after long periods of exposure particularly as compared to non-coated insulators or insulators coated with non-curing silicone compounds. Test procedures, as described in the examples, have been developed to compare the ability of different insulator materials and constructions to resist the effects of the high voltage stresses under wet, contaminated service conditions to aid in predicting the usefulness of various constructions as high voltage insulators. The examples illustrate the properties of improved high voltage insulators of this invention.

The well known ceramic suspension insulator often does not function for long periods of time in areas which are subjected to severe airborne contamination of ionic materials and moisture. The glass or porcelain used to construct this type of insulator is easily wetted by atmospheric mositure. Particles of contamination easily adhere to the high energy surfaces. In the presence of ionic contamination on the insulator surface and subsequent wetting, leakage currents are created over the insulator surface. When the current is at a high enough level, dry band regions form and arcing occurs. The heat of the arc is localized and can cause the ceramic portion of the insulator to crack or break due to localized heating and uneven expansion of the brittle material. The leakage currents can also reach such high levels that the insulator flashes over, a condition which can cause the transmission line to shut down. In either case, the insulator must be repaired or replaced in order to restore the line to a functioning condition.

One method of maintaining ceramic insulators in a useful condition in areas of contamination is periodic washing of the insulating surface to remove the film of contaminants. In areas of high contamination this must be done frequently because the high energy surface of ceramic insulation is easily coated by particles of contamination that are attracted to it and easily stick to it. Frequent cleaning is an expensive operation and can be very dangerous as the line is usually cleaned while it is energized.

Another method which has been developed to improve the usefulness of ceramic suspension insulators has been to coat the insulator surface with a non-curing silicone compound. The compound is of a grease-like consistency and a layer of about 3mm thickness is applied by troweling the compound onto the insulator. It is also applied by thinning with solvent and spraying. This coating converts the insulator surface to a hydrophobic surface which inhibits the formation of surface leakage currents because the formation of continuous film of moisture is inhibited. When these insulators are located in areas of contamination, the contamination particles are absorbed into the grease-like compound and a hydrophobic surface is maintained for some time after the application of the compound. When the contamination is too great and the surface is no longer sufficiently hydrophobic, the compound must be removed and a new coating applied.

The method of this invention is an improvement over the use of such non-curing silicone compounds. The silicone composition used in the method of this invention is a room temperature curable composition. After curing, the silicone composition surface is very hydrophobic and has a low surface energy. Particles of contamination do not become absorbed into the composition as in the non-curing grease-like coatings thereby permitting a much longer maintainance-free life. Eventual excessive contamination particles are easily washed off the cured surface naturally by rain or snow or by a less frequent maintenance procedure. The cured coating is bonded to the insulator surface and can be washed with high pressure water to remove excessive surface contamination and restore the surface to its original clean, hydrophobic condition without removing and replacing the composition as in the case of the grease-like coatings.

The method of this invention provides a coated insulator which has many advantages over previous insulators. The ease of cleaning and refurbishing as compared to conventional insulators coated with silicone compound has been discussed above. Insulators coated as in the method of this invention have a surface which maintains a low energy leakage current level over a longer period of time when in use. The method seals the entire surface of the insulator thus aiding in preventing the ingress of liquid moisture into the insulator, particularly in the case of composite insulators which are built up out of a number of components which are attached to each other. If a void exists in the interior of the insulator resulting from a manufacturing defect, moisture ingress into such a void can lead to a failure of the insulator due to a conductive track being generated due to the arcing that occurs in such voids during use.

The method of this invention provides a coated insulator that can be manufactured in place. Conventional insulators such as ceramic suspension insulator strings, ceramic post insulators, composite suspension insulators, filled-resin post insulators, and cable terminations can be coated in the field by applying the one package, room temperature curable composition onto the insulator and curing it by exposing it to atmospheric moisture. The coated insulator then has the advantages of a hydrophobic, arc-resistant, bonded, cured surface. The method of this invention allows the upgrading of insulators that are already in service.

Under conditions of severe contamination and exposure to moisture, leakage currents form over insulator surfaces. These leakage currents eventually effect the insulator surface and the surface becomes more conductive and the amount of leakage current increases. At some point a failure of the insulator will occur due to some event such as insulator breakage, flashover, tracking of the insulator surface or erosion of the insulator surface. In order to avoid failure, the insulator must be repaired or replaced in order to remain operative. The coated insulators of this invention are easily repaired when it becomes necessary. Because the coated insulator is hydrophobic and arc resistant, there is no sudden failure. Under long time stress, the surface will gradually support higher leakage currents and dry-band arcing will occur but the surface will not track and erosion takes place at a slow rate. In many cases, washing will restore a surface by removing contamination. When the surface can no longer be restored in this manner, the surface can be restored by first washing to remove contamination, then applying a new coating of silicone composition to the surface after drying. The old coating does not have to be removed as in the case of the non-cured, grease-like coatings. An insulator with a mechanically damaged coating can be easily repaired by recoating the damaged portion.

Coated insulators manufactured following the method of this invention are useful in applications such as suspension insulators and stand-off or post insulators in high voltage transmission lines of greater than 69 KV and in high voltage distribution lines of greater than 13.8 KV, as insulators in substations and on switchgear, on cable terminations, and on insulators used in connection with electrified railway systems. The one package, room temperature curable silicone composition can be used to provide a weatherproof coating for metal hardware, used in places subjected to electrical fields, to provide corrosion protection.

The following examples are included to illustrate embodiments of this invention and to demonstrate the usefulness of insulators produced following the method of this invention. In the examples, quantities labeled as parts are parts by weight.

EXAMPLE 1

A series of test insulators were prepared to evaluate different methods of construction.

A test rod was prepared by coating a glazed porcelain rod 152 mm in length and 25.4 mm in diameter with a one-part, room temperature curable silicone composition falling within the claims of this invention. This silicone composition was prepared by adding 100 parts of a hydroxyl endblocked polydimethylsiloxane having from 5 to 15 percent of the hydroxyl radicals replaced with trimethylsiloxy radicals to a dough mixer. The average degree of polymerization was about 535 and a small amount of cyclic polydimethylsiloxane contaminant. The viscosity was about 12.5 Pa·s at 23° C. This material is hereinafter referred to as Polymer A. Then 133 parts of aluminum hydroxide having an average particle size of about 0.7 micrometers, a specific gravity of about 2.42, and about 35 percent by weight water of hydration was admixed while heating to 175° C. under full vacuum for 1 hour. After cooling, 72 parts of hydrocarbon solvent having a specific gravity of 0.73 and a boiling range of from 100° C. to 160° C. (VM and P Naptha) was slowly admixed until a uniform product was produced. Then 19.9 parts of methyltri-(methyethylketoximo) silone 0.4 parts of dibutyltindioctoate were stirred in in the absence of moisture along with 0.3 parts of finely divided pigment. The rod was coated by mounting on a horizontal position and rotating while dipping the lower portion of the rod into a mixture of 1115 g of the above silicone composition and 85 g of additional hydrocarbon solvent. After 3 revolutions to apply a smooth coating to the rod, the dip pan was lowered and the rod continued revolving while the solvent evaporated. After drying the rod was allowed to cure for 7 days at 50 percent relative humidity and 23° C. before testing. This is construction A.

A rod was molded by milling a silicone elastomer stock to soften, then forming a 180 g preform and placing in a rod mold to produce a rod 25.4 mm in diameter and 203 mm long. The silicone elastomer stock contained 100 parts of a silicone rubber base comprising 100 parts of polydimethylsiloxane gum having 0.142 mole percent vinyl radicals, 23 parts of fumed silica, and 7.5 parts of hydroxyl endblocked polydimethylsiloxane fluid as a treating agent; 120 parts of aluminum hydroxide as described above; 1 part of heat stability additive, 0.1 part of methacryloxypropyltrimethoxysilane; and 1 part of 50 percent active powder of 2,5-bis(tertbutylperoxy)-2,5-di-methylhexane. The rod was molded for 15 minutes at 190° C., removed from the mold, and deflashed. It was cut to a length of 152 mm. This comparative construction, Construction B, uses a composition which must be heat cured.

A rod was molded in a similar manner using a different silicone elastomer stock. This stock contained 100 parts, of a base comprising 100 parts of a mixture of 85 parts of polydimethylsiloxane gum having dimethylvinylsiloxy endblocking and 15 parts of polydimethylsiloxane gum having 2 mole percent methylvinylsiloxy groups and dimethylvinylsiloxy endblocking, 15 parts of fumed silica, 200 parts of the aluminum hydroxide described above, and 10 parts of filler treating agent; the base being catalyzed with 0.45 parts of the catalyst powder described above. The rod was molded for 15 to 20 minutes at a temperature of 175° C. This comparative construction, Construction C, uses a composition which must be heat cured.

A comparative construction was prepared in the same manner as construction A but using a different silicone composition, falling outside this invention. This composition was prepared by mixing 100 parts of a silicone rubber base containing 100 parts of polydimethylsiloxane gum having 0.142 mole percent vinyl radical, 55 parts of fumed silica, and 14 parts of treating agent; 5.5 parts of the aluminum hydroxide described above; 0.84 part of trimethylsiloxy endblocked polyorganosiloxane having an average of 5 methylhydrogensiloxane units and 3 dimethylsiloxane units per molecule; 5.4 parts of trimethylsiloxy endblocked polymethylhydrogensiloxane with a silicon-bonded hydrogen atom content of about 1.6 weight percent; 0.55 parts of a solution of chloroplatinic acid in isopropanol having a platinum content of 0.22 weight percent; 0.28 part of 3-methyl-l-butyn-3-ol; 2.2 parts of grey pigment; and 430 parts of 1,1,1-trichloroethane. This silicone rubber dispersion was coated onto a glazed porcelain rod using the coating procedure described for construction A. After air drying for 24 hours at 23° C., the dry rod was cured for 1 hour at 150° C. in an air circulating oven. This is comparative construction D.

Two rods of each of the above constructions were then tested for their suitability as high voltage insulators in an accelerated test procedure in a fog chamber.

TEST DESCRIPTION

The fog chamber is a cubicle with five foot sides and a pyramid roof. It is constructed of ⅜" Plexiglass sheeting. The chamber sits on a stainless steel drip pan which is tapered towards a central drain. All this is mounted on a steel frame with wheels which elevate the drip pan 40 cm above the floor.

A pump, filter, and water reservoir are stored in this 40 cm space between drip pan and floor. Flexible hosing connects the high pressure side of the pump to polyvinylchloride piping mounted on the exterior of the fog chamber.

The fog is developed by eight nozzles located symetrically around the chamber 130 cm above the drip pan and aimed to spray towards the center at an angle 20° from the horizontal.

Integral to the fog chamber is a Halon fire extinguishing system. This contains one eight pound Halon bottle with control panel mounted on the fog chamber exterior and two heat detectors mounted on the inside.

Voltage to the test samples is supplied by a high voltage power supply. Output capacity is 60KVA at a variable A.C. voltage from 0-30KV.

The construction to be evaluated are prepared for testing by mounting graphite disks on each end of the rods to serve as electrodes. A stainless steel wire is used to attach the electrode to a high voltage bus at the center top area of the fog chamber. The bottom electrode is attached by another stainless steel wire to a 75 cm diameter nylon ring. This configuration suspends the samples at a 45° angle in the central area of the fog chamber. The stainless steel wire is connected to ground outside of the chamber through a 1 ohm resistor. During testing, leakage current signals are picked off a resistor and transmitted through an analog to digital converter to a micro computer which monitors the leakage current over the surface of the insulator. The micro computer prints out an accumulated surface charge which is convertable by multiplying by a conversion factor. The conversion factor was arrived at by system calibration with dc and ac current. The apparatus tests 8 samples at a time.

The test procedure exposes the samples to the conditions of outdoor exposure, but to a greater degree to accelerate the effect. Because fog conditions with contamination on the insulator surface is the worst condition for insulators, the test subjects the insulators to this type of exposure. Since fog conditions are intermittent, a test cycle consists of 16 hours under fog conditions, and under voltage stress, then 8 hours at 50 percent relative humidity without voltage. The 152 mm long insulator is subjected to a stress of 9 KV. This is about 1.5 times the stress level normally placed on commercial glazed porcelain insulators. The fog is produced by spraying about 3.3 liters per minute of a solution of 0.95 g of NaCl in 10 liters of distilled water to give a conductivity of 200 microsiemens into the fog chamber. After 5 cycles the severity of the test is increased by increasing the conductivity of the water used to generate the fog to 500 microsiemens. After 10 cycles the conductivity is again increased, to 1000 microsiemens.

TEST RESULTS

Two examples of each of the four constructions described above were placed in the fog chamber and subjected to 12 test cycles as described above. Table I summarizes the different types of insulator constructions and the cumulative charges. The performance of an insulator depends upon its resistance to current flow over the surface of the insulator during such severe conditions and the resistance of its surface to the effect of the scintillation currents set up during the test. The currents create arcing and dry band formation over the surface of the insulator. The arcing and the high temperatures and ozone formed by the arcing can attack the insulator surface. When attacked and chemically modified, the insulator surface normally becomes more conductive and the amount of leakage current gradually rises. The total effect upon the insulator surface is dependent upon the nature of the surface and upon the nature and composition of the base material in those cases where the construction makes use of more than one composition.

The test results of Table I show that construction B and construction C form insulators that begin to show current flow early in the test when compared to constructions A and D. The rate of increase is essentially uniform through the test after the fog conductivity is raised after the 5th cycle. Constructions A and D operate at a very low current flow through the 5th cycle, then begin to show higher flow rates after the fog conductivity is raised. The rate of current flow for A and D remains at a lower value than found for B and C. Construction D was effected by the current flow to such an extent that one of the samples flashed over at the 10th cycle. The other sample of construction D did not flash over, however the protective circuit on the measuring device operated so that no measurement of current flow was determined during the 9th and 10th cycles. The protective device was reactivated at the 11th cycle and measurements continued.

Construction A shows in this test that it is most suitable for insulation construction. The composition of the coating is such that the flow of current is lower, thus exposing the insulator to less damage from the current flow and the coating withstands the effects of the current flow in that it does not form a conductive track or cause a flashover. Construction A is the only one of these constructions that can be applied in the field to upgrade existing insulators because the composition used in this construction can be diluted with solvent so that it can be brushed or sprayed to apply it to the insulator, then the coating will dry and cure under ambient conditions to give an improved electrical high voltage insulator. Constructions B and C must be molded and heat cured, so they can not be field applied. Construction D is heat cured so it can not be field applied.

EXAMPLE 2

A substantial quantity of one package, room temperature curable silicone composition was prepared to allow evaluation in accelerated tests and to allow testing on full size units.

A large dough mixer was loaded with 2.9 kg of Polymer A and heated to 175° C. Then 4.65 kg of aluminum hydroxide was admixed. The mixture was mixed for 1½ hours at 175° C. and full vacuum, then 0.64 kg of additional Polymer A was admixed. After cooling, 1.84 kg of non-reactive hydrocarbon solvent (VM and P Naptha) was slowly admixed. Another identical batch was made to obtain sufficient material. A mixture of 1.36 kg of methyltri(methylethylketoximo)silane and 25.7 g of dibutyltindioctoate was added to 19.52 kg of the above dispersion to yield a room temperature curable, one part silicone composition, having about 47.7 percent by weight of a mixture within the scope of (A) and 52.3 percent by weight of aluminum hydroxide.

A pair of high voltage insulator strings was prepared by constructing a 4 unit and 5 unit string using standard porcelain 254 mm by 146 mm suspension insulator. Each string was then brush coated with the above silicone composition so as to apply a smooth coating over the entire porcelain surface of the insulators of at least 0.3 mm thickness. The coating was allowed to dry and cure, giving a bonded coating over the surface of each insulator of at least 0.25 mm thickness.

The test insulators, along with a control insulator consisting of a 5 unit string of non-coated porcelain units, were then energized on a 66 KV line to ground test station located in a coastal area where the insulators were exposed to salt contamination during the dry summer months and exposure to fog or rain during the winter months. After approximately 2 years outdoor exposure the 4 unit string flashed over during a heavy fog condition. Inspection after removing from service showed no sign of tracking or erosion on the surface. The 5 unit string was removed from test after 6 years and 5 months of exposure with no flashover. The non-coated porcelain control 5 unit string flashed over within 1 to 3 months from the start of the test.

TABLE I

| Construction | A | | B | | C | | D | |
|---|---|---|---|---|---|---|---|---|
| Rod | Porcelain | | Silicone Elastomer | | Silicone Elastomer | | Porcelain | |
| Coating | Silicone Composition | | None | | None | | Silicone Composition | |
| Aluminum hydroxide, percent | 52.5 | | 61 | | 66.7 | | 8.3 | |
| Cycle | Accumulated Charge (Coulombs Calculated) | | | | | | Accumulated Charge (Coulombs Calculated) | |
| 1 | $2.07 \times 10^{-6}$ | $2.07 \times 10^{-6}$ | $1.53 \times 10^{-4}$ | $2.21 \times 10^{-5}$ | 1.04 | 9.87 | 0 | 0 |
| 2 | $4.14 \times 10^{-6}$ | $2.07 \times 10^{-6}$ | 7.38 | $5.21 \times 10^{-2}$ | 27.3 | 57.5 | $2.07 \times 10^{-6}$ | $2.76 \times 10^{-6}$ |
| 3 | $1.04 \times 10^{5}$ | $2.89 \times 10^{-4}$ | 24.7 | 10.9 | 63.5 | 106 | $2.07 \times 10^{-6}$ | $2.76 \times 10^{-6}$ |
| 4 | $1.04 \times 10^{-5}$ | $2.89 \times 10^{-4}$ | 24.7 | 10.9 | 63.5 | 123 | $2.07 \times 10^{-6}$ | $2.76 \times 10^{-6}$ |
| 5 | $1.04 \times 10^{-5}$ | $2.89 \times 10^{-4}$ | 24.7 | 16.3 | 73.8 | 164 | $1.86 \times 10^{-5}$ | $2.76 \times 10^{-6}$ |
| 6 | $6.10 \times 10^{-3}$ | $4.89 \times 10^{-3}$ | 331 | 338 | 362 | 502 | 8.35 | $9.52 \times 10^{-3}$ |
| 7 | $1.60 \times 10^{-2}$ | $2.49 \times 10^{-2}$ | 603 | 564 | 766 | 821 | 224 | $2.46 \times 10^{-2}$ |
| 8 | 144 | 332 | 800 | 745 | 1021 | 1145 | 458 | $4.23 \times 10^{-2}$ |
| 9 | 363 | 598 | 973 | 918 | 1283 | 1373 | 642 | (ii) |
| 10 | 640 | 794 | 1166 | 1152 | 1573 | 1684 | 814 | |
| 11 | 925 | 973 | 1394 | 1325 | 1904 | 1980 | (i) | |
| 12 | 3229 | 1173 | 1615 | 1622 | 2084 | 2194 | | |

(i) Flashed over
(ii) Recorder failed

EXAMPLE 3

One part, moisture curing silicone compositions were prepared for evaluation as coatings on insulators.

A 4 liter dough mixer was loaded with 534 g of a mixture of hydroxyl endblocked polydimethylsiloxane, Polymer B, having an average degree of polymerization of about 535 and a small amount of cyclic polydimethylsiloxane as an impurity. The viscosity of the mixture was about 12.5 Pa·s at 25° C. Then 127 g of a mixture, Mixture B, of 33 percent by weight of a benzene soluble resin copolymer having trimethylsiloxane units and $SiO_2$ units in a ratio of about 0.77/1 and a hydroxyl content of about 1.5 percent by weight and 67 percent by weight of trimethylsiloxy endblocked polydimethylsiloxane fluid having a viscosity of about 0.1 Pa·s at 25° C. was added. The mixer was heated with steam at a pressure of 1000 kPa and then 1143 g of aluminum hydroxide having an average particle size of about 0.7 micrometers was slowly added with mixing to give a homogenous mixture. The mixer was closed and mixing continued for one hour at a temperature of about 175° C. with reduced pressure applied to the mixer contents to remove volatile material. An additional 133 g of the Polymer B was admixed and heating and reduced pressure continued for one half hour, then an additional 64 g of Mixture B was admixed and heat and reduced pressure continued for one hour, after which time the heat and reduced pressure were removed and the mixer and contents allowed to cool overnight while continuing mixing. The product is referred to as Mixture 1.

A mixer capable of combining ingredients without exposing them to the atmosphere was loaded with 908 g of the above Mixture 1. Then 100 g of methyltri(methylethylketoximo)silane was thickened to a paste consistency with fumed silica and the paste admixed into the base. The material was then transferred into polyethylene tubes suitable for storage without exposure to the air. This product is Composition 1, containing 47 percent of (A) and 53 percent of (B) when calculated as stated in the claims.

A second composition was prepared in a similar manner to Composition 1 except 770 g of Mixture 1 was combined with 80 g of methyltri(methylethylketoximo)silane that contained 3 percent by weight of dibutyltindioctoate. This product is Composition 2, comprising 46.7 percent of (A) and 53.3 percent of (B).

A solvent dispersion of Composition 2 was prepared by mixing 140 g of Composition 2 in 60 g of dry toluene. This is Dispersion A.

A comparative sample was prepared in which there was no filler present in the composition. A base material was prepared by thoroughly mixing 200 g of the Polymer B with 50 g of the Mixture B. To this was added 25 g of the methyltri(methylethylketoximo)silane and 1 g of dibutyltindioctoate. This Composition 3, comprising only (A), cured on exposure to moisture.

The above materials were evaluated for their possible usefulness as coatings for electrical insulators. Samples of Composition 1, and Composition 2, and comparative Composition 3 were calendered to a thickness of 2.0 mm on pieces of polyester resin-fiberglass panels 50 mm by 125 mm by 6 mm thick. The coating was allowed to cure by exposure to the atmosphere for 4 days, then the arc-track resistance of the coating was evaluated by a method similar to ASTM D-2303. The standard procedure calls for the sample to be placed in the holder at 45° to horizontal with the surface to be tested on the bottom. The test solution flows down from the top electrode to the bottom electrode over the sample surface. Because these cured compositions are very hydrophobic, the test solution would not wet and flow along the surface but would drop off before reaching the bottom electrode. The test was modified by turning the sample over so that a continuous film of test solution could be established from the top electrode to the bottom electrode. The test was run using a voltage of 2.5 KV, a series resistance of 10 kilohms, a contaminate solution of 0.1 weight percent of ammonium chloride and 0.02 weight percent of Triton X-100 wetting agent in distilled water, and a contaminate flow rate of 0.15 cc/min.

After 1250 minutes under these arc-track conditions, the surface of Composition 1 was quite black over a 25 mm width from the bottom to top electrode. Erosion had occurred at the bottom electrode with a narrow band extending up and toward the top electrode for about 12 mm. The eroded area extended through the coating and into the plastic panel beneath. The track propagation on the panel was extremely slow.

After 1250 minutes under these arc-track conditions, the surface of Composition 2 was dark over a 25 mm width from the bottom to top electrode. Erosion had occurred over a small area at the bottom electrode, extending upward about 6 mm. The erosion at its deepest part in the center had not penetrated through the coating. This coating containing the tin catalyst gave better results than Composition 1 not containing the tin in the arc-track test.

Comparative Composition 3 developed a deep and narrow track from electrode to electrode in 88 minutes.

Dispersion A was used in preparing a sample for test in a fog chamber. A porcelain rod 25 mm in diameter was dipped into the dispersion to provide a smooth coating over the surface of the rod. The coating was allowed to dry and cure by exposing to the atmosphere for several days. The rod was then fitted with aluminum paint electrodes with a 152.4 mm spacing between the electrodes. A fog chamber was used to subject the sample to a variable high voltage 60 cycle alternating current. A fog nozzle sprayed tap water into the chamber at a rate which gave a "fog density" rate of 706 g tap water per cubic meter per minute. The test consisted of subjecting the rod to an increasing voltage while monitoring the current leakage rate over the surface of the sample. After 1 hour exposure to 18 KV, there was no leakage. The voltage was then raised to 24 KV. A leakage current appeared, but the sample did not flash over. After 1 hour the voltage was raised to 30 KV. Flash over occurred after 2 minutes at the 30 KV level.

A fog chamber test sample was prepared from Composition 3 and tested in the same manner as above. There was no leakage at 18 KV, leakage current developed at 24 KV, with flashover about 2 minutes after the voltage was raised to 30 KV. A porcelain rod with no coating flashed over during the one hour cycle at 24 KV.

This comparative sample shows that the aluminum hydroxide filler in Compositions 1 and 2 does not lower the fog chamber test result and does give the composition greatly improved arc-track resistance when compared to comparative Composition 3 without the aluminum hydroxide filler.

EXAMPLE 4

A composition was prepared using a different polydimethylsiloxane than used in Example 3.

A dough mixer was loaded with 591 g of Polymer A. Then 100 g of Mixture B was admixed and the mixer heated to 175° C. Then 1143 g of aluminum hydroxide was slowly admixed to form a homogeneous paste. The mixer was closed and the contents mixed for 1½ hours at temperature while under full vacuum. Then 74 g of Polymer A was added after the heat and vacuum were removed. When the contents reached room temperature, 91 g of Mixture B was admixed. Then 400 g of dry hydrocarbon solvent was added to thin the mixture to application viscosity. Then 205 g of a mixture of methyltri(methylethylketoximo)silane and 2.5 percent by weight dibutyltindioctoate was admixed and the mixture was placed in a container on a shaker for 2 hours to ensure thorough mixing. This composition has 48.1 percent by weight of material within the scope of (A) and 51.9 percent by weight aluminum hydroxide.

A group of samples for fog chamber testing were prepared by dip coating 25.4 mm diameter rods, 254 mm long, made of fiberglass reinforced epoxy resin into the above dispersion then allowing to dry and cure on exposure to the atmosphere.

One of the samples was evaluated in the fog chamber following the procedure of Example 3. The sample went through 36 minutes at 24 KV with no measured leakage current, then developed about 5 milliampere. Flashover occurred at about 10 minutes after the voltage had been raised to the 30 KV cycle.

EXAMPLE 5

A dispersion was prepared in which the Mixture B, intended as a filler treatment, was not used.

A dough mixer was loaded with 700 g of Polymer A and heated to 175° C., then 1143 g of aluminum hydroxide was slowly added so that the mixture remained a fluid paste at all times. The mixing continued for 1½ hours at 175° C. and full vacuum, then an additional 158 g of Polymer A was added. After cooling to room temperature 400 g of hydrocarbon solvent (VM&P Naptha) was admixed and mixing continued for 2 hours.

A mixture of 156 g of methyltri(methylethylketoximo)silane and 4 g of dibutyltindioctoate was heated to 70° C. to obtain solution, then cooled and added to 2200 g of the above dispersion. This mixture was then placed on a shaker overnight to insure a uniform mixture. A sample exposed to the atmosphere skinned over and became non-tacky on the surface in 15 minutes. The mixture contained 47.4 percent of mixture within the scope of (A) and 52.6 percent aluminum hydroxide.

Test samples were prepared by diluting 200 g of the above dispersion with 4 g of the hydrocarbon solvent and preparing arc-track test samples as in Example 3.

When 2 samples were tested for arc-track resistance as in Example 3, neither sample had failed after 1000 minutes at which point the test was discontinued, showing that the coating has excellent arc-track resistance.

EXAMPLE 6

A comparative mixture was prepared to evaluate a different cure system.

A mixture was prepared in the same manner as in Example 3. The mixture was catalyzed by mixing 0.9 kg of Mixture 1 of Example 3 with 100 g of vinyltriacetoxysilane, thickened with fumed silica, in the absence of moisture. This mixture contained 47 percent of mixture within the scope of (A) and 53 percent of aluminum hydroxide.

A sample for arc-track testing was prepared from the above mixture as in Example 3. After 1140 minutes under test, severe erosion and track propagation had occurred. A deep track, 12 mm wide at the bottom electrode extended upward for about 38 mm where it was 3 mm wide. This sample eroded much more than did Composition 1 of Example 3.

The catalyzed material cured in the storage tubes in less than 2 months, showing that it was not storage stable.

EXAMPLE 7

A silicone composition falling within the claims of this invention which included the polydiorganosiloxane fluid (3) was prepared and tested in comparison to a composition not containing the fluid.

A composition was prepared in the same manner as the composition used in construction A of Example 1, using the following materials:

| | |
|---|---|
| Polymer A | 383.5 g |
| Polymer C | 383.5 |
| Aluminum hydroxide | 1020 |
| Naptha | 555.5 |
| Methyltri(methylethylketoximo)silane | 152.4 |
| Dibutyltindioctoate | 2.9 |

Polymer C was trimethlsiloxy endblocked polydimethylsiloxane fluid having a viscosity of 12.5 Pa·s at 23° C.

The above composition and the composition of construction A of Example 1 were then used to make test rods as in Example 1 which were tested as in Example 1. The results were:

| | With fluid (3) | Without fluid (3) |
|---|---|---|
| Cycle 1 | $1.86 \times 10^{-4}$ | $1.10 \times 10^{-5}$ |
| Cycle 15 | 1711 | 759 | showing that both materials are efficient at supressing leakage currents.

That which is claimed is:

1. A method of improving an electrical high voltage insulator comprising
   (I) applying to a high voltage insulator whose surface has arc resistance of at least 750 minutes when measured according to ASTM D-2303 at 2.5 KV, a smooth, coherent, coating of a one package, room temperature curable silicone composition wherein the composition comprises the product obtained by mixing in the substantial absence of moisture,
   (A) from 45 to 70 percent by weight of
      (1) 100 parts by weight of polydimethylsiloxane fluid of the formula Y(Me<sub>2</sub>SiO)<sub>a</sub>H

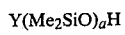

in which Y is methyl or hydroxyl radical, at least 85 percent of Y are hydroxyl radicals, a has an average value such that the viscosity is in the range of from 5 to 20 Pa·s at 23° C., and Me is methyl radical and,
      (2) from 5 to 30 parts by weight of silane of the formula $$R_bSi(ON=X)_{4-b}$$

in which R is selected from the group consisting of monovalent hydrocarbon radicals and monovalent halohydrocarbon radicals, X is selected from the group consisting of $R_2'C=$ and

radicals in which R' is selected from the group consisting of monovalent hydrocarbon radicals and monovalent halohydrocarbon radicals and R" is selected from the group consisting of divalent hydrocarbon radicals and divalent halohydrocarbon radicals and b is an integer from 0 to 1 inclusive, (B) from 30 to 55 percent by weight of aluminum hydroxide having an average particle size of less than 5 micrometers, and the sum of (A) and (B) being 100 percent, (C) optionally, a non-reactive solvent, the product being storage stable in containers which exclude moisture, but which cures when exposed to moisture, then (II) exposing the coating to atmospheric moisture for a time sufficient to cure the coating to produce a bonded, elastomeric coating of at least 0.25 mm thickness.

2. The method of claim 1 in which the silane is of the formula $$R_bSi(ON=CR_2')_{4-b}$$

in which R and R' are each monovalent hydrocarbon radicals.

3. The method of claim 2 in which the silane is selected from the group consisting of methyltri(dimethylketoximo)silane and methyltri(methylethylketoximo)silane.

4. The method of claim 1 in which mixture (A) also contains a condensation catalyst consisting of a carboxylic acid salt of tin.

5. The method of claim 4 in which the amount of aluminum hydroxide (B) is in the range from 40 to 55 percent by weight and the viscosity of the polydimethylsiloxane is in the range from 10 to 15 Pa·s at 23° C.

6. The method of claim 1 in which (A) also contains up to 100 parts by weight of a polydimethylsiloxane fluid (3) of the formula $$Me(Me_2SiO)_cSiMe_3$$

in which c has an average value such that the viscosity is greater than 0.05 Pa·s at 23° C. and Me is methyl radical.

7. The method of claim 1 in which the product obtained in mixing (A) and (B) is dispersed in a non-reactive solvent to yield a homogeneous mixture.

8. The method of claim 7 in which the polydimethylsiloxane fluid (1) and aluminum hydroxide (B) are combined into a homogeneous mixture, then heated for a time at a temperature sufficient to remove any free water, cooling, then slowly adding the solvent while mixing, then admixing the silane (2), to yield a homogeneous mixture.

9. The method of claim 8 in which the polydimethylsiloxane fluid (1) has a viscosity in the range from 10 to 15 Pa·s at 23° C., and (B) is in the range from 40 to 55 percent by weight.

10. The method of claim 1 in which the high voltage insulator is porcelain.

11. The method of claim 1 in which the high voltage insulator is glass.

12. The method of claim 1 in which the high voltage insulator is an organic resin or elastomer.

13. A composition suitable for coating the surface of a high voltage insulator comprising the product obtained by mixing in the substantial absence of moisture (A) from 45 to 70 percent by weight of
  (1) 100 parts by weight of polydimethylsiloxane fluid of the formula $$Y(Me_2SiO)_aH$$

in which Y is methyl or hydroxyl radical, at least 85 percent of Y are hydroxyl radicals, a has an average value such that the viscosity is in the range of from 5 to 20 Pa·s at 23° C., and Me is methyl radical, and
  (2) from 5 to 30 parts by weight of silane of the formula $$R_bSi(ON=X)_{4-b}$$

in which R is selected from the group consisting of monovalent hydrocarbon radicals and monovalent halohydrocarbon radicals, X is selected from the consisting of $R_2'C=$ and

radicals in which R' is selected from the group consisting of monovalent hydrocarbon radicals and monovalent halohydrocarbon radicals and R" is selected from the group consisting of divalent hydrocarbon radicals and divalent halohydrocarbon radicals and b is an integer from 0 to 1 inclusive, (B) from 30 to 55 percent by weight of aluminum hydroxide having an average particle size of less than 5 micrometers, the sum of (A) and (B) being 100 percent, and (C) optionally, a non-reactive solvent, the product being storage stable in containers which exclude moisture, but which cures when exposed to moisture.

14. The composition of claim 13 in which the (A) also contains up to 100 parts by weight of a polydimethylsiloxane fluid (3) of the formula $$Me(Me_2SiO)_cSiMe_3$$

in which c is an average value such that the viscosity is in the range of from 5 to 20 Pa·s at 23° C. and Me is methyl radical.

15. The composition of claim 13 in which the polydimethylsiloxane fluid (1) has a viscosity in the range from 10 to 15 Pa·s at 23° C., the amount of (B) is in the range from 40 to 55 percent by weight, the silane is of the formula $$CH_3Si(ON=CR_2')_3$$

wherein R' is methyl or ethyl, and the mixture (A) also contains a condensation catalyst consisting of a carboxylic acid salt of tin.

16. The composition of claim 13 in which the product obtained in mixing (A) and (B) is dispersed in a non-reactive solvent to yield a homogeneous mixture.

17. The composition of claim 15 in which the product obtained in mixing (A) and (B) is dispersed in a non-reactive solvent to yield a homogeneous mixture.

18. An electrical high voltage insulator produced by the method of claim 1.

19. An electrical high voltage insulator produced by the method of claim 6.

20. An electrical high voltage insulator produced by the method of claim 7.

* * * * *

UNITED STATES PATENT AND TRADEMARK OFFICE
CERTIFICATE OF CORRECTION

PATENT NO.  : 4,476,155

DATED       : October 9, 1984

INVENTOR(S) : Randolph G. Niemi

It is certified that error appears in the above-identified patent and that said Letters Patent is hereby corrected as shown below:

In column 12, line 63, "silone" should read -- silane --.

In column 22, line 35, "from the consisting" should read -- from the group consisting --.

Signed and Sealed this

Fourth Day of June 1985

[SEAL]

Attest:

DONALD J. QUIGG

Attesting Officer    Acting Commissioner of Patents and Trademarks